May 25, 1965 — L. C. CHOUINGS — 3,185,259
SELF ENERGIZING, SPOT DISC BRAKES
Filed Nov. 6, 1962 — 2 Sheets-Sheet 1

INVENTOR
LESLIE C. CHOUINGS
BY Lawrence J. Winter
ATTORNEY

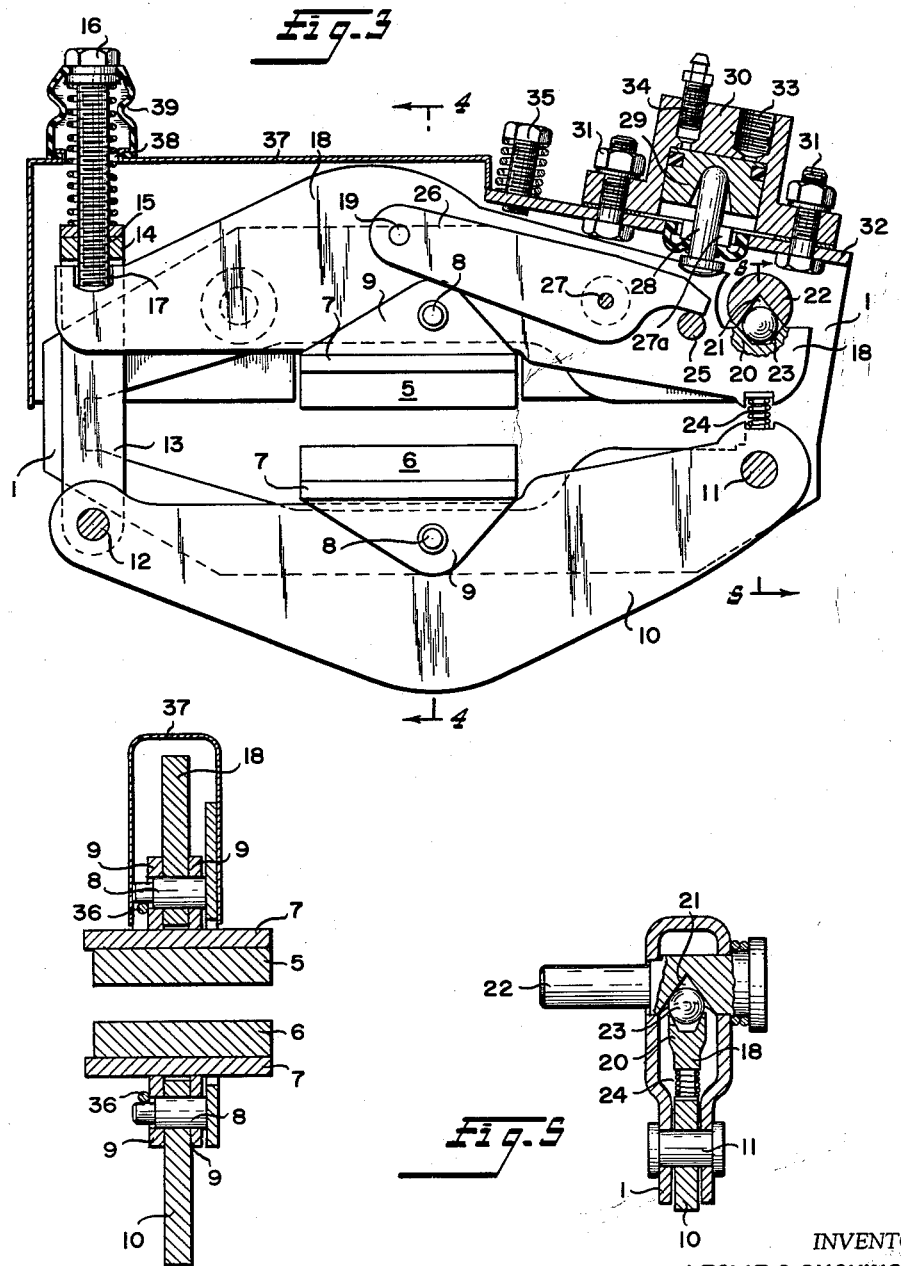

3,185,259
SELF ENERGIZING, SPOT DISC BRAKES
Leslie C. Chouings, Leamington Spa, England, assignor to Automotive Products Company Limited, Leamington Spa, England
Filed Nov. 6, 1962, Ser. No. 235,788
Claims priority, application Great Britain, Nov. 9, 1961, 40,209/61
10 Claims. (Cl. 188—73)

This invention relates to disc brakes and has for an object to provide a disc brake which is operable both by manual and fluid pressure operated brake actuating means, the brake also incorporating if desired means providing a servo-action so that the same is self-energising.

In a disc brake according to the present invention, the brake pads on either side of the brake disc are each carried by an arm each of which extends along opposite sides of the brake disc, said arms being interconnected with one another and mounted so as to be swingable in a plane normal to the plane of rotation of the brake disc, brake actuating means comprising a fluid pressure actuated cylinder, and a brake actuating lever, both operatively associated with one of said arms so as to be independently operable to effect a swinging movement of the associated arm, to bring the pad carried thereby into contact with the brake disc, the reaction force set up resulting in swinging movement of the other arm to bring the pad carried thereby also into contact with the brake disc. The arms are carried by a fixed support on, or adapted to be mounted on, a stationary part of a wheel assembly, the fluid pressure actuated cylinder also being mounted on the fixed support.

To provide for the servo-action, the arm associated with the brake actuating means, is mounted so as to be capable of displacement in its lengthwise direction, in addition to its swinging movement, and under the action of the drag force set up as a result of the engagement of the brake pad carried thereby with the rotating brake disc, such displacement causing operation of means applying the servo-action. Further in order to compensate for wear on the brake pads manually adjustable means can be provided. Additionally, and in order to compensate for the angular movement of the arms resulting from the swinging movement thereof each brake pad can be pivotally mounted on the appropriate arm whereby the same will be self-aligning with the brake disc when moved into contact therewith.

Figure 1:
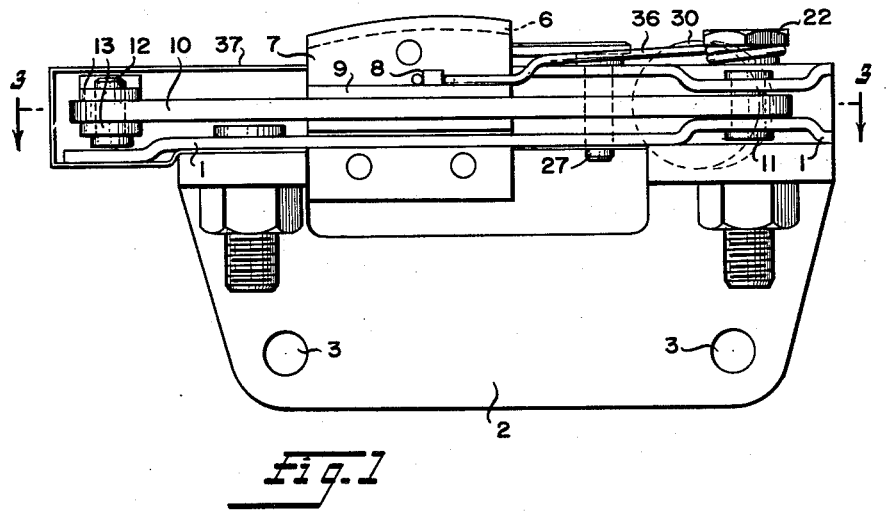
Figure 2:
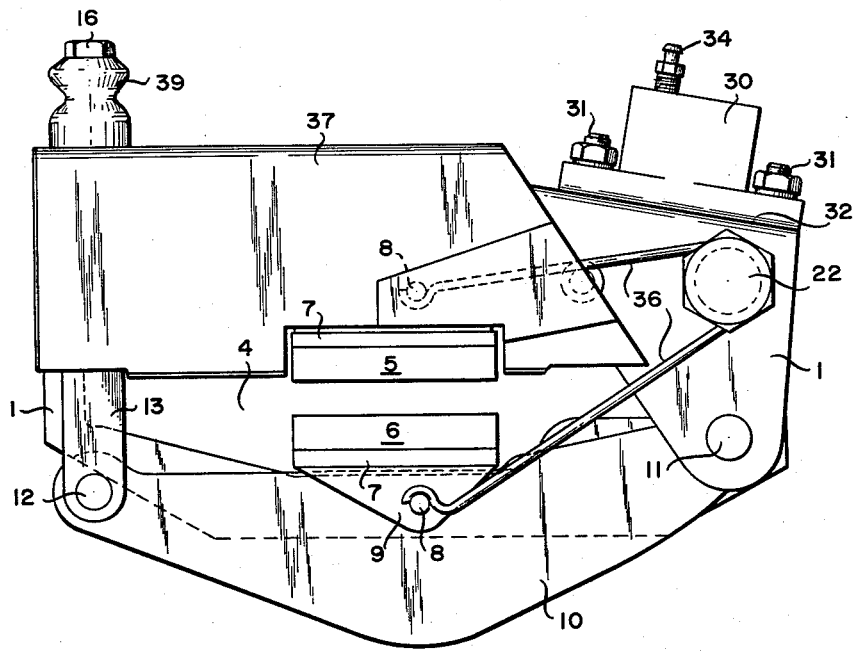

A disc brake according to one embodiment of the invention will now be described by way of example by aid of the accompanying diagrammatic drawings in which:

FIGURE 1 is a view of the disc brake in side elevation;
FIGURE 2 is a top plan view of FIGURE 1;
FIGURE 3 is a view partly in section on the line III—III of FIGURE 1;
FIGURE 4 is a fragmentary view on the line IV—IV of FIGURE 3; and
FIGURE 5 is a further fragmentary view on the line V—V of FIGURE 3.

In the disc brake shown in the accompanying drawings, a fixed support is provided having a flange portion provided by a plate 1 bolted to lugs and a web portion 2 at right angles to one another, the web portion 2 having holes 3 to receive bolts for securing the fixed support to a stationary part of a wheel assembly, the flange portion 1 extending perpendicular to the plane of rotation of the brake disc (not shown) when the fixed support is assembled in position. The flange plate 1 has an opening 4 to receive a peripheral portion of the brake disc and brake pads 5, 6 disposed one on either side of the brake disc. Each brake pad has a metal backing plate 7 and is pivotally mounted on an arm 10, 18 on a pivotal mounting arranged intermediate the length of the arm. Each pivotal mounting consists of a pivot pin 8 passing through aligned holes in the appropriate arm, and a pair of spaced lugs 9 projecting outwardly from each metal backing plate 7, the lugs of each pair being disposed one on either side of the arm. The arms are disposed one on either side of the brake disc so as to extend parallel to the flange plate 1 of the fixed support, and lengthwise thereof. The arm on one side of the brake disc herein referred to as the first arm 10, is pivotally mounted at one end on a pivot pin 11 carried by the flange plate 1 of the fixed support, and arranged perpendicular to the said flange plate so that the arm is capable of swinging movement in a plane normal to the plane of rotation of the brake disc. The opposite end of this arm 10 is pivotally connected by pivot pin 12, to one end of a link 13 which is disposed perpendicular to the plane of rotation of the brake disc, and parallel to the flange plate 1 of the fixed support. The opposite end of the link 13 has a lug 14 provided with a tapped hole 15, to receive a bolt 16 which extends co-axially with the link. The end 17 of the threaded portion of the bolt 16, thus faces in the direction of the brake disc and bears against one end of an arm herein referred to as the second arm 18, on the opposite side of the brake disc to said first mentioned arm 10. The opposite end of this second arm 18 has a V section slot 20 therein, which faces a conical detent recess 21 in the shank of a stationary pin 22 carried by the flange 1 of the fixed support, the slot 20 and recess 21 forming a gap to receive a ball 23. The arm 18 is spring loaded so as to be urged towards the stationary pin 22 by a compression spring 24, one end of which bears against the edge of the said first mentioned arm 10, in the region of its pivotal mounting 11 to the flange plate 1 of the fixed support, the other end of the spring bearing against the arm 18. The arms 10 and 18 are urged away from the brake disc by a spring 36 (FIG. 2). The spring is anchored at one end to the stationary pin 22, the outer ends of the arms of the spring engaging with the pivot pins 8 on which the brake pads are pivotally mounted.

The second arm 18 carries an abutment provided by a stop pin 25 located on the arm in the region of the semi-circular bush. The stop pin 25 is engaged on its side remote from the brake disc, by the edge adjacent one end of a brake actuating lever 26, pivotally mounted on a pivot pin 27 on the flange plate 1 of the fixed support, so that the actuating lever 26 is also swingable in a plane normal to the plane of rotation of the brake disc. The brake actuating lever 26 provides means for effecting manual operation of the brake for which purpose the end 19 of the lever remote from that in contact with the stop pin 25 is adapted for connection to the linkage of the hand brake of a vehicle.

A hydraulic cylinder 30 secured by bolts 31 to a bracket 32 forming part of the flange plate 1, has a piston 29 which is operatively coupled to the arm 18, through a push rod 28. The push rod 28 passes through a guide bush 27a in the bracket 32, the outer end of the push rod having a spherical head disposed in a correspondingly shaped recess in the edge of the arm 18, the inner end of the push rod also being rounded and engaging with the correspondingly rounded inner end of a conical recess in the piston. The hydraulic cylinder 30 has a port 33 adapted for connection to the hydraulic circuit of the brake system and a breather port 34.

In operation, upon the admission of pressure liquid to the hydraulic cylinder, the piston moves outwardly thus causing swinging movement of arm 18 in the clockwise direction (FIG. 3). This swinging movement of the second arm 18 causes the brake pad 5 carried by the said second arm to move into contact with the brake disc. The reaction force set up results in the swinging movement of the first mentioned arm 10, whereby the brake pad 6 carried thereby is also brought into contact with the brake disc. The engagement of the brake pad 5 carried by the second arm 18 with the rotating disc causes the said arm 18 to float in the lengthwise direction, so that lateral displacement between the arm 18 and the stationary pin 22 takes place whereby the camming action between the V section groove 20, recess 21 and the ball 23 located therebetween, results in additional swinging movement of the two arms to provide a servo-action. By adjusting the bolt 16 carried by the link 13 interconnecting the arms 10, 18 the relative positions of the arms can be adjusted to compensate for wear on the brake pads.

During manual operation of the brake by operation of the hand brake lever, the brake actuating lever 26 has a swinging movement in the clockwise direction (FIG. 3). This movement is transmitted to the arm 18 through the stop pin 25, so that said arm receives the appropriate swinging movement to bring the pad 5 into contact with the brake disc, the reaction set up bringing the brake pad 6 also into contact with the brake disc, a servo-action as above described also being created.

A stop member provided by a bolt 35 screwed into a tapped hole in the bracket 32, is located in the path of swinging movement of the second lever 18, the stop member being arranged to co-operate with an abutment edge surface on said lever, to restrain the same against unwanted movement away from the brake disc during rotation thereof and assist in the elimination of chatter in the brake.

The brake mechanism is partially enclosed by a removable cover 37, the cover having a hole 38 for the passage of the bolt 16, and a boot 39 closing the hole.

I claim:

1. A disc brake comprising a fixed support for attachment to a wheel assembly, a first arm pivotally connected at one of its ends to said support for swinging movement in a horizontal plane, a second arm carried by said support extending parallel to said first arm and spaced therefrom, brake pads carried by said arms on their adjacent sides for applying a braking force to a brake disc, a link member extending transversely between said arms adjacent the ends of the arms opposite said one pivoted end, a pivot pin connecting said first arm to the adjacent end of said link member, other means connecting the opposite end of said link member with the adjacent end of said second arm, stationary pin means on said fixed support adjacent the end of said second arm disposed adjacent said first arm pivoted end, and spring means bearing against the adjacent ends of said arms at said pivoted end urging said second arm against said stationary pin, and brake actuating means comprising a fluid actuated cylinder and a brake actuating lever selectively operatively connected with said second arm to effect a swinging movement of said second arm to bring its brake pad into contact with a brake disc for the wheel assembly, the reaction force set up resulting in swinging movement of the first arm to bring its pad into contact with the brake disc, and means mounting said second arm for lengthwise movement in a direction substantially normal to said swinging movement.

2. The brake disc of claim 1 wherein an abutment is disposed on said second arm remote from the link member end thereof and engageable by one end of said lever for producing swinging movement of said second arm.

3. The brake disc of claim 2 wherein said fluid actuated cylinder is disposed on the same side of said second arm as said lever, and is provided with a piston extension which engages said second arm to swing it.

4. The disc brake of claim 3, wherein said arms are spring loaded, the spring action urging each arm in a direction away from each other and the brake disc.

5. A disc brake according to claim 1, wherein adjusting means are provided for compensating for wear on the brake pads.

6. A disc brake according to claim 1, wherein adjusting means are incorporated in said other means connecting said second arm and link member.

7. A disc brake according to claim 1, wherein the brake pads are pivotally mounted on said arms so as to be self-aligning with the brake disc when moved into contact therewith.

8. A disc brake according to claim 2, wherein said actuating lever is provided with means adapted for coupling to a hand brake mechanism so as to be manually operable independently of the fluid pressure operation.

9. A disc brake comprising a fixed support for attachment to a wheel assembly, a pair of arms mounted on said support for swinging movement in a horizontal plane, normal to the plane of rotation of the brake disc, link means interconnecting one end of said arms, brake pad means carried by each said arm, brake actuating means comprising a fluid actuated cylinder and a brake actuating lever selectively operatively connected to one of said arms to effect a swinging movement of said one arm to bring its brake pad means into contact with a brake disc for the wheel assembly, the reaction force set up resulting in swinging movement of the other arm to bring its brake pad means into contact with the brake disc, and means mounting said one arm for movement in a lengthwise direction substantially perpendicular to its swinging movement for permitting lengthwise displacement of said one arm to apply a servo action to increase the engagement force.

10. A disc brake comprising a fixed support for attachment to a wheel assembly, a first arm pivotally connected at one of its ends to said support for swinging movement in a horizontal plane, a second arm carried by said support extending parallel to said first arm and spaced therefrom, brake pads carried by said arms on their adjacent sides for applying a braking force to a brake disc, a link member extending transversely between said arms adjacent the ends of the arms opposite said one pivoted end, a pivot pin connecting said first arm to the adjacent end of said link member, other means connecting the opposite end of said link member with the adjacent end of said second arm, stationary pin means on said fixed support adjacent the end of said second arm disposed adjacent said first arm pivoted end, and spring means bearing against the adjacent ends of said arms at said pivoted end urging said second arm against said stationary pin, and brake actuating means comprising a fluid actuated cylinder and a brake actuating lever selectively operatively connected with said second arm to effect a swinging movement of said second arm to bring its brake pad into contact with a brake disc for the wheel assembly, the reaction force set up resulting in swinging movement of the first arm to bring its pad into contact with the brake disc, and cam means comprising a ball means disposed in a gap formed between a substantially V section slot in said stationary pin and a conical detent recess disposed in the end of the second arm opposite said link member.

References Cited by the Examiner

UNITED STATES PATENTS

| | | | |
|---|---|---|---|
| 1,995,135 | 3/35 | Williams et al. | 188—73 |
| 2,334,169 | 11/43 | Aurien | 188—59 |
| 2,655,228 | 10/53 | Eksergian | 188—72 |
| 2,663,384 | 12/53 | Chamberlain | 188—72 X |
| 2,862,581 | 12/58 | Lucien | 188—73 |
| 2,867,295 | 1/59 | Butler | 188—152 X |

EUGENE G. BOTZ, *Primary Examiner.*

ARTHUR L. LA POINT, *Examiner.*